US010642347B2

(12) United States Patent
Jiang (10) Patent No.: US 10,642,347 B2
(45) Date of Patent: May 5, 2020

(54) VR GLASSES (71) Applicant: Beijing Xiaomi Mobile Software Co., Ltd., Beijing (CN)

(72) Inventor: Hao Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 116 days.

(21) Appl. No.: 15/949,430

(22) Filed: Apr. 10, 2018

(65) Prior Publication Data
US 2018/0292891 A1 Oct. 11, 2018

(30) Foreign Application Priority Data

Apr. 10, 2017 (CN) .......................... 2017 1 0229574

(51) Int. Cl.
G02B 27/01 (2006.01)
G06F 3/01 (2006.01)
A45F 5/00 (2006.01)
G06F 1/16 (2006.01)

(52) U.S. Cl.
CPC ............... G06F 3/011 (2013.01); A45F 5/00 (2013.01); G02B 27/0176 (2013.01); G06F 1/1605 (2013.01); A45F 2200/0516 (2013.01); A45F 2200/0525 (2013.01)

(58) Field of Classification Search
CPC ...... G02B 27/0176; G02B 7/02; G02B 23/12; G02B 27/01; G02B 27/017
See application file for complete search history.

(56) References Cited

U.S. PATENT DOCUMENTS

2005/0217879 A1 10/2005 Xiong et al.
2016/0066295 A1 3/2016 Han et al.

FOREIGN PATENT DOCUMENTS

| CN | 105589562 | A | 5/2016 | |
| CN | 105739100 | * | 7/2016 | ............. G02B 27/01 |
| CN | 105739100 | A | 7/2016 | |
| CN | 205594232 | U | 9/2016 | |
| CN | 106019597 | A | 10/2016 | |
| CN | 205643870 | U | 10/2016 | |
| CN | 205899147 | U | 1/2017 | |

(Continued)

OTHER PUBLICATIONS

Extended European Search Report dated Aug. 28, 2018 in European Patent Application No. 18166448.3, 7 pages.

(Continued)

Primary Examiner — Joseph P Martinez
(74) Attorney, Agent, or Firm — Oblon, McClelland, Maier & Neustadt, L.L.P.

(57) ABSTRACT

The present disclosure relates to Virtual Reality (VR) glasses, which include: a glasses body; a cover plate fixedly attached to the glasses body; and a receiving space formed between the glasses body and the cover plate, wherein the receiving space is configured to receive an electronic device, wherein a support pad is provided on a side of the cover plate that is facing the glasses body, wherein a surface of the support pad includes a plurality of projections, such that when the electronic device is placed into the receiving space, the plurality of projections are configured to deform and generate a support force towards the electronic device, so as to press against and hold the electronic device in the receiving space.

10 Claims, 6 Drawing Sheets (56) References Cited

FOREIGN PATENT DOCUMENTS

| | | |
|---|---|---|
| CN | 106873164 A | 6/2017 |
| CN | 206301287 U | 7/2017 |
| CN | 207020395 U | 2/2018 |
| JP | 2008-249139 A | 10/2008 |
| JP | 2015-106915 A | 6/2015 |
| JP | 2016-5125 A | 1/2016 |
| KR | 10-2016-0026143 A | 3/2016 |

OTHER PUBLICATIONS

International Search Report dated Jan. 12, 2018 in PCT/CN2017/096778 (with English translation of Category of Cited Documents), 6 pages.
Written Opinion of the International Search Authority dated Jan. 12, 2018 in PCT/CN2017/096778, 8 pages.
Combined Chinese Office Action and Search Report dated Mar. 20, 2018 in Chinese Patent Application No. 201710229574.X (with English translation of Search Report only), 6 pages.
Office Action dated Jun. 28, 2019 in Japanese Patent Application No. 2018-521970, 10 pages. (with English translation).

* cited by examiner

VR GLASSES

CROSS-REFERENCE TO RELATED APPLICATIONS

This application is based upon and claims priority to Chinese Patent Application No. 201710229574.X, filed on Apr. 10, 2017, the entire contents of which are incorporated herein by reference.

TECHNICAL FIELD

The present disclosure generally relates to the technical field of Virtual Reality (VR), and more particularly, to VR glasses.

BACKGROUND

Virtual reality (VR) technology involves a computer simulation system capable of generating a simulated environment and providing a user with an immersive application experience by means of a three-dimensional dynamic visual scene, entity behavior interaction, and the like.

In related technology, a simple and low-cost VR solution is proposed, which provides VR glasses including a VR function component and provides playing back of VR contents through a user's electronic device, such as a smart phone or a tablet.

However, due to great differences between sizes, specifications, materials, and the like, of different electronic devices, it is usually impossible for VR glasses in the related technology to firmly clamp the electronic devices. Therefore jitter, shake, and the like, easily occur during use, affecting a user's immersive experience and even bringing about the user's discomfort, such as dizziness.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide Virtual Reality (VR) glasses including a glasses body; a cover plate fixedly attached to the glasses body; and a receiving space formed between the glasses body and the cover plate, wherein the receiving space is configured to receive an electronic device, wherein a support pad is provided on a side of the cover plate that is facing the glasses body, wherein a surface of the support pad includes a plurality of projections, such that when the electronic device is placed into the receiving space, the plurality of projections are configured to deform and generate a support force towards the electronic device, so as to press against and hold the electronic device in the receiving space.

According to an aspect, the support pad includes a first fitting surface facing the cover plate, and the first fitting surface protrudes towards the cover plate to form the plurality of projections.

In an example, a recess is formed in the first fitting surface, and the plurality of projections are positioned on a bottom surface of the recess.

According to another aspect, the plurality of projections include one or more protruding ribs.

In an example, the protruding ribs are arranged along a width direction or a height direction of the cover plate.

According to another aspect, the plurality of projections include one or more bumps.

According to another aspect, the support pad includes a first fitting surface that is facing the cover plate; and retainers that are provided in an edge region of the first fitting surface, wherein the retainers are configured to be engaged in clamping grooves in a surface of the cover plate to assemble the support pad on the cover plate.

According to yet another aspect, the support pad further includes a second fitting surface facing the glasses body, wherein the second fitting surface includes a guiding part and a pressing part, wherein the guiding part is configured to guide the electronic device being arranged in the receiving space, and wherein the electronic device is pressed against by the pressing part after being arranged in the receiving space.

In an example, the guiding part includes a slope facing an opening direction of the receiving space.

According to an aspect, the support pad is made of silica gel material.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated herein and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not exclusively represent all implementations consistent with the present disclosure. Instead, they are merely examples of apparatuses and methods consistent with aspects related to the present disclosure and recited in the appended claims.

Terms used in the present disclosure are intended not to limit the present disclosure but only to describe specific aspects. Singular articles "a" and "an" used in the present disclosure and the appended claims are also intended to include plural forms, unless other meanings are clearly indicated in the context. It should also be understood that terms "and/or" used in the present disclosure refers to and includes any or all possible combinations of one or more associated items which are listed.

It should be understood that terms "first", "second", "third" and the like may be adopted to describe various elements in the present disclosure, but the elements should not be limited to these terms. These terms are only adopted to distinguish elements of the same type. For example, without departing from the scope of the present disclosure, the first element may also be known as the second element, and similarly, the second element may also be known as the first element, depending on a context. For example, a word "if" used here may be explained as "while", "when" or "in response to".

Figure 1:
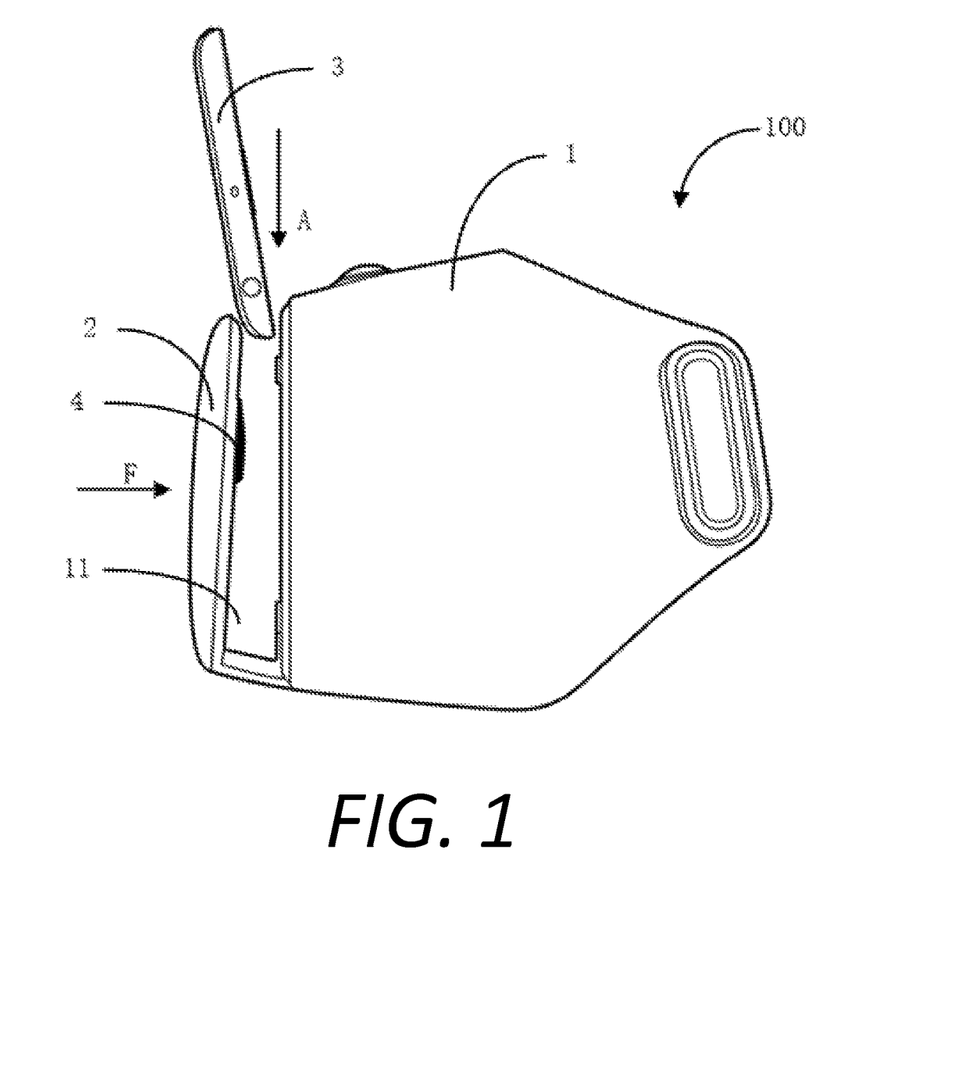
FIG. 1 is a schematic diagram of an assembly of VR glasses and an electronic device according to an exemplary aspect of the present disclosure.

FIG. 1 shows virtual reality (VR) glasses according to an exemplary aspect. As shown in FIG. 1, the VR glasses 100 may include a glasses body 1 and a cover plate 2. The glasses body 1 is fixedly connected with the cover plate 2 to form a receiving space 11 receiving an electronic device 3 after connection. The receiving space 11 has an opening direction A as shown in FIG. 1, so that the electronic device 3 can be placed into the receiving space 11 along the opening direction A. After the electronic device 3 is assembled in the receiving space 11, a screen of the electronic device 3 faces the glasses body 1, and a rear panel faces the cover plate 2, so that a user can watch a played content of the electronic device 3 after wearing the VR glasses. For reinforcing the assembly of the electronic device 3, a support pad 4 may be arranged on the side of the cover plate 2 facing the glasses body 1, so as to support the rear panel of the electronic device 3 by the support pad 4.

Figure 2:
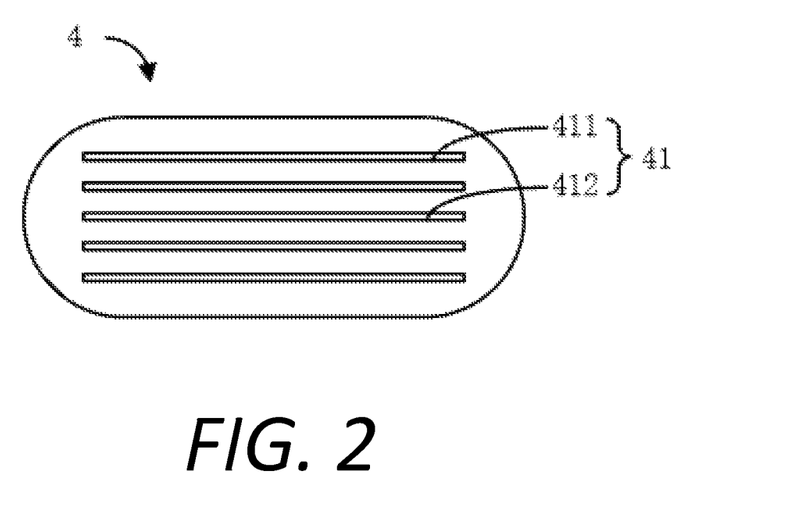
FIG. 2 is a schematic diagram illustrating a support pad according to an exemplary aspect of the present disclosure.

As shown in FIG. 2, a plurality of projections 41 may be arranged on a surface of the support pad 4. When the electronic device 3 is arranged in the receiving space 11 along the opening direction A, the plurality of projections 41 may be deformed under an action of an external assembling force, thereby generating an support force F facing the electronic device 3. The support force F may act on the rear panel of the electronic device 3 along a direction shown by an arrow in FIG. 1, and under an action of the support force F, the electronic device 3 can be pressed against and held in the receiving space 11, so as to keep the electronic device 3 being fitted in the glasses body 1.

From the abovementioned aspect, it can be seen that the projections 41 on the support pad 4 can be deformed under the action of the external assembling force, and exert the support force F which is generated accordingly on the electronic device 3. In comparison with a support pad 4 without any projection 41, the deformation can be amplified. Therefore a support force transferred from a cover plate 2 side to the electronic device 3 is increased, and the relative position of the electronic device 3 in the receiving space 11 is stabilized. Shaking of the electronic device 3 caused as the VR glasses are moved is avoided, which would lead to a deviation of the played content relative to the user's sight line, and then influence the user's immersive experience.

Figure 3:
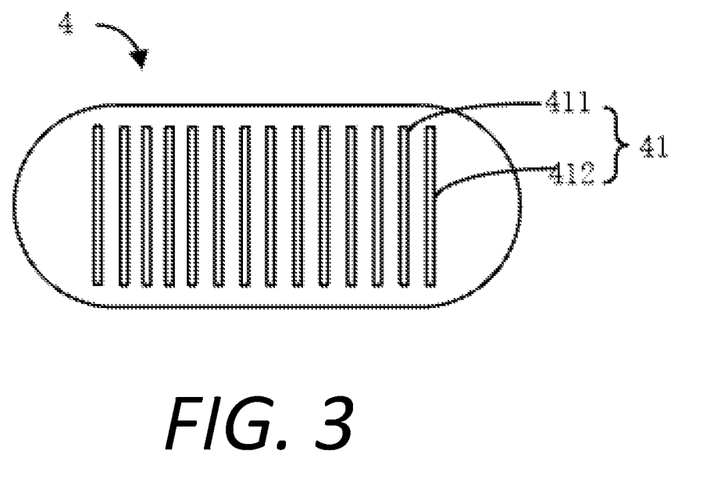
FIG. 3 is another schematic diagram illustrating a support pad according to an exemplary aspect of the present disclosure.

In the aspect, the plurality of projections 41 may include one or more projections, for example protruding ribs 411 and 412 arranged along a width direction of the cover plate 2, as shown in FIG. 2. The aspect of the present disclosure here only gives exemplary description, but not limits the number and shape of the projection. The protruding ribs 411 and 412 may also be arranged along a height direction of the cover plate 2 as shown in FIG. 3, or may be arranged at acute angles width direction or height direction of the cover plate 2. This is not limited in the aspect of the present disclosure.

Figure 4:
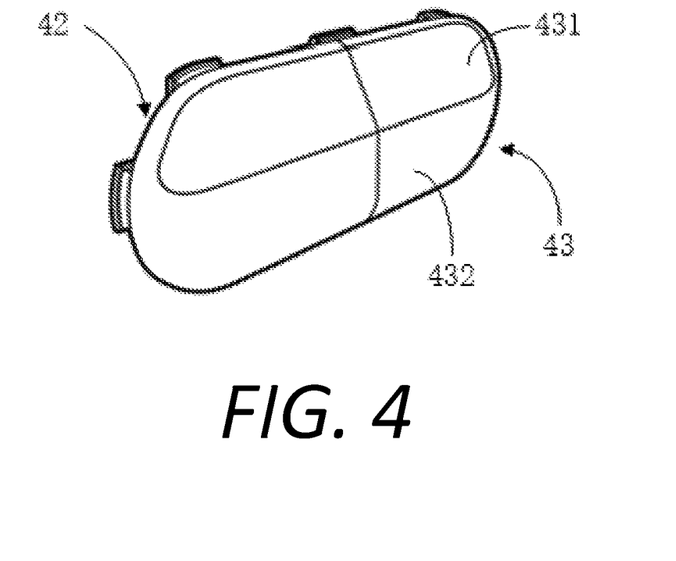
FIG. 4 is yet another schematic diagram illustrating a support pad according to an exemplary aspect of the present disclosure.
Figure 5:
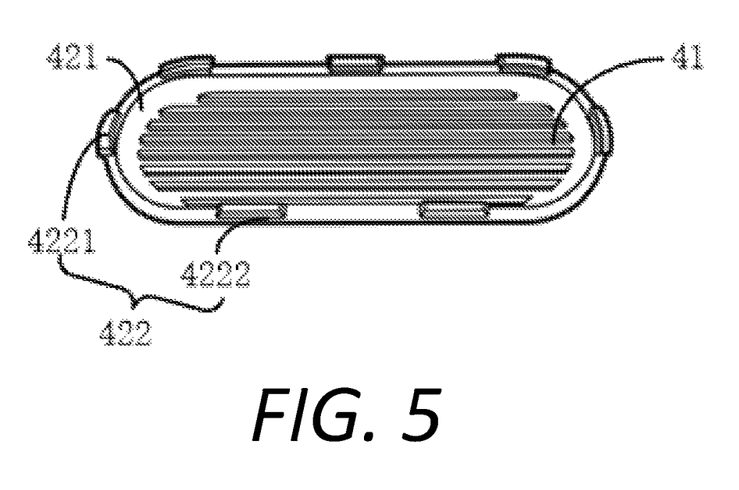
FIG. 5 is still another schematic diagram illustrating a support pad according to an exemplary aspect of the present disclosure.

In an aspect, the protruding ribs 411 and 412 may be formed by extensions towards the cover plate 2 from a first fitting surface 42 of the support pad 4, which is on the side, facing the cover plate 2, of the support pad 4, as shown in FIG. 4, so as to provide the support force F without influencing assembling of the electronic device 3. Furthermore, a recess 421 may be formed in a surface of the first fitting surface 42, and the protruding ribs 411 and 412 are arranged on a bottom surface of the recess 421, as shown in FIG. 5, so that heights of the protruding ribs 411 and 412 are increased, maximum deformation of the projections 41 is increased, and a limit value of the support force F is increased, so as to provide a proper support force F for electronic devices with different thicknesses to keep them in the receiving space 11. Of course, the protruding ribs 411 and 412 may alternatively be formed by extensions towards the glasses body 1 from a second fitting surface 43 of the support pad 4, which is on the side, facing the glasses body 1, of the support pad 4. This is not limited in the aspect of the present disclosure.

Figure 6:
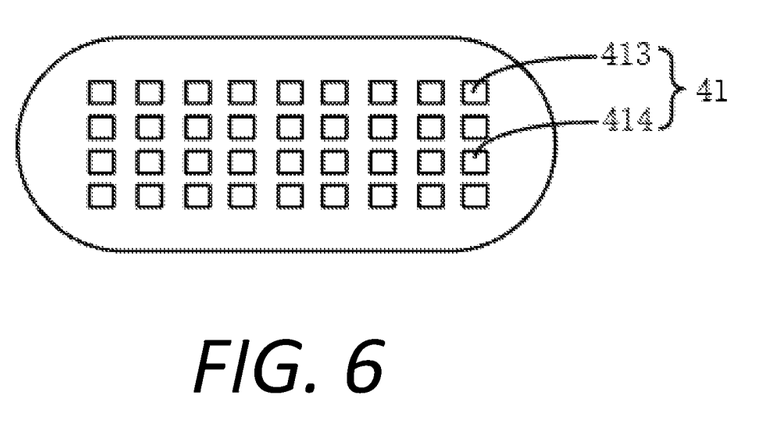
FIG. 6 is another schematic diagram illustrating a support pad according to an exemplary aspect of the present disclosure.

In the aspect, the plurality of projections 41 may also include one or more bumps, for example bumps 413 and 414 shown in FIG. 6. In comparison with a structure adopting the protruding ribs 411 and 412, the rear panel of the electronic device 3 can be pressed more uniformly, and the electronic device 3 can be prevented from tilting in the receiving space 11 under the action of the support force F. The plurality of projections 41 may also be in the form of a combined structure of the bumps and the projecting ribs may also be adopted for. This is not limited in the aspect of the present disclosure.

According to each abovementioned aspect, when the electronic device 3 is placed into the receiving space 11 along the opening direction A, an obliquely downward assembling force on the support pad 4 may be generated. Therefore, for firmly assembling the support pad 4 on the cover plate 2, retainers 422 may be arranged in an edge region of the first fitting surface 42, for example retainers 4221 and retainers 4222 shown in FIG. 5 as an example. The number of the retainers is not limited in the aspect of the present disclosure. The retainers 4221 and 4222 may be engaged in corresponding clamping recesses in a surface of the cover plate 2, thereby stably arranging the support pad 4 on the cover plate 2 through an engagement of the clamping recesses and the retainers 422. Displacement, detachment and the like caused by the action of the external assembling force will not take place.

In the aspect, a guiding part 431 and a pressing part 432 shown in FIG. 4 may be provided on the second fitting surface 43 of the support pad 4. The guiding part 431 can guide the electronic device 3 being arranged into the receiving space 11. For example, the guiding part 431 is a slope arranged towards the opening direction A. The electronic device 3 can be put into the receiving space 11 more easily under guidance of the slope, so that the assembling difficulty is reduced. The pressing part 432 will press against the rear panel of the electronic device 3 which is completely placed in the receiving space 11, so as to transfer the support force F to the electronic device 3.

According to the technical solution of the aspect of the present disclosure, the support pad 4 is made of elastic material, and thus can be deformed under the action of the external assembling force. After the electronic device 3 is taken out, the support pad 4 may be recovered from deformation, so as to facilitate frequent assembling and disassembling of the electronic device 3. The elastic material may be silica gel material, foam, resin and the like. This is not limited in the aspect of the present disclosure.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and implementation of the aspect of the present disclosure. This application is intended to cover any variations, uses or adaptations of the aspect of the present disclosure following the general principles thereof and including such departures from the aspect of the present disclosure as come within known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. Virtual Reality (VR) glasses, comprising:
    a glasses body;
    a cover plate fixedly attached to the glasses body; and
    a receiving space formed between the glasses body and the cover plate, wherein the receiving space is configured to receive an electronic device,
    wherein a support pad is provided on a side of the cover plate that is facing the glasses body, wherein a surface of the support pad includes a plurality of projections, such that when the electronic device is placed into the receiving space, the plurality of projections are configured to deform and generate a support force towards the electronic device, so as to press against and hold the electronic device in the receiving space, and wherein the support pad is made of elastic material.

2. The VR glasses of claim 1, wherein the support pad comprises a first fitting surface facing the cover plate, and the first fitting surface protrudes towards the cover plate to form the plurality of projections.

3. The VR glasses of claim 2, wherein a recess is formed in the first fitting surface, and the plurality of projections are positioned on a bottom surface of the recess.

4. The VR glasses of claim 1, wherein the plurality of projections comprise one or more protruding ribs.

5. The VR glasses of claim 4, wherein the protruding ribs are arranged along a width direction or a height direction of the cover plate.

6. The VR glasses of claim 1, wherein the plurality of projections comprise one or more bumps.

7. The VR glasses of claim 1, wherein the support pad comprises:
    a first fitting surface that is facing the cover plate; and
    retainers that are provided in an edge region of the first fitting surface, wherein the retainers are configured to be engaged in clamping grooves in a surface of the cover plate to assemble the support pad on the cover plate.

8. The VR glasses of claim 7, wherein the support pad further comprises:
    a second fitting surface facing the glasses body,
    wherein the second fitting surface comprises a guiding part and a pressing part,
    wherein the guiding part is configured to guide the electronic device being arranged in the receiving space, and
    wherein the electronic device is pressed against by the pressing part after being arranged in the receiving space.

9. The VR glasses of claim 8, wherein the guiding part comprises a slope facing an opening direction of the receiving space.

10. The VR glasses of claim 1, wherein the support pad is made of silica gel material.

* * * * *